United States Patent
Park et al.

(10) Patent No.: US 9,822,857 B2
(45) Date of Patent: Nov. 21, 2017

(54) PLANETARY GEAR TRAIN OF AUTOMATIC TRANSMISSION FOR VEHICLE

(71) Applicant: Hyundai Motor Company, Seoul (KR)

(72) Inventors: Jong Sool Park, Hwaseong-si (KR);
Dong Hwan Hwang, Seoul (KR);
Seong Wook Hwang, Gunpo-si (KR);
Seongwook Ji, Ansan-si (KR); Chang Wook Lee, Suwon-si (KR); Hyun Sik Kwon, Seoul (KR); SeokJin Kim, Hwaseong-si (KR); Kyeong Hun Lee, Seoul (KR); Wonmin Cho, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/181,078

(22) Filed: Jun. 13, 2016

(65) Prior Publication Data

US 2017/0159774 A1 Jun. 8, 2017

(30) Foreign Application Priority Data

Dec. 2, 2015 (KR) .................. 10-2015-0170993

(51) Int. Cl.
*F16H 3/66* (2006.01)

(52) U.S. Cl.
CPC .............. *F16H 3/666* (2013.01); *F16H 3/66* (2013.01); *F16H 2200/0065* (2013.01); *F16H 2200/2012* (2013.01); *F16H 2200/2046* (2013.01)

(58) Field of Classification Search
CPC ..... F16H 2200/2012; F16H 2200/2046; F16H 2200/0065; F16H 3/66; F16H 3/666
See application file for complete search history.

(56) References Cited

U.S. PATENT DOCUMENTS

| | | | |
|---|---|---|---|
| 2013/0281246 A1* | 10/2013 | Neelakantan ........... | F16H 59/38 475/120 |
| 2014/0256498 A1* | 9/2014 | Lippert ..................... | F16H 3/62 475/275 |
| 2015/0031492 A1* | 1/2015 | Lippert ..................... | F16H 3/66 475/275 |

FOREIGN PATENT DOCUMENTS

| | | |
|---|---|---|
| KR | 10-2012-0132021 A | 12/2012 |
| WO | WO 2013/146032 A1 | 10/2013 |

* cited by examiner

*Primary Examiner* — Erin D Bishop
(74) *Attorney, Agent, or Firm* — Morgan, Lewis & Bockius LLP

(57) ABSTRACT

A planetary gear set of an automatic transmission for a vehicle may include input and output shafts for receiving and outputting torques, first to fourth planetary gear sets respectively forming first to third, fourth to sixth, seventh to ninth, and tenth to twelfth rotational elements, and six control elements each of which selectively interconnects a corresponding pair among the input and output shafts, the rotational elements, and a transmission housing, where the input and output shafts are fixedly connected to the first and eleventh rotational elements respectively, respective pairs of the first and sixth rotational elements, the second and ninth rotational elements, the third and tenth rotational elements, the fifth and eleventh rotational elements are fixedly interconnected, and the seventh rotational element is selectively connected to the transmission housing.

12 Claims, 2 Drawing Sheets

FIG. 2

| shift-stage | control element | | | | | | gear ratio | step ratio | gear ratio span |
|---|---|---|---|---|---|---|---|---|---|
| | C1 | C2 | C3 | B1 | B2 | B3 | | | |
| D1 | | ● | | | | ● | 5.636 | | 9.2 (Tunable) |
| D2 | ● | ● | | | ● | ● | 3.430 | 1.643 | |
| D3 | ● | | ● | | | ● | 2.233 | 1.536 | |
| D4 | | | ● | ● | | ● | 1.621 | 1.378 | |
| D5 | ● | | ● | ● | | | 1.226 | 1.322 | |
| D6 | ● | ● | ● | | | | 1.000 | 1.226 | |
| D7 | | ● | ● | ● | | | 0.882 | 1.134 | |
| D8 | | | ● | | ● | | 0.744 | 1.185 | |
| D9 | | | ● | ● | ● | | 0.614 | 1.212 | |
| REV | | | | ● | ● | ● | -4.116 | | |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0170993, filed Dec. 2, 2015, the entire contents of which is incorporated herein for all purposes by this reference.

BACKGROUND OF THE INVENTION

Field of the Invention

The present invention relates to an automatic transmission for a vehicle.

Description of Related Art

The recent increase in oil prices has caused car makers to meet global demands for improving fuel efficiency.

In this sense, research is being conducted on engines in terms of reducing weight and improving fuel efficiency by down-sizing, and research is also being conducted to ensure both drivability and competitiveness for maximizing fuel efficiency by implementing an automatic transmission with multiple speed stages.

In order to achieve more shift stages for an automatic transmission, the number of internal components is generally increased as the number of gear shift stages is increased, and as a result, the automatic transmission may be difficult to mount, the manufacturing cost and weight may be increased, and power transmission efficiency may be deteriorated.

Therefore, in order to maximally enhance fuel consumption of an automatic transmission having more shift stages, it is important for better efficiency to be derived by a smaller number of parts.

In this respect, an eight-speed automatic transmission has been recently introduced, and a planetary gear train for an automatic transmission enabling more shift stages is under investigation.

Considering that gear ratio spans of recently developed eight-speed automatic transmissions are typically between 6.5 and 7.5, fuel consumption enhancement is not very large.

In the case of a gear ratio span of an eight-speed automatic transmission having a level above 9.0, it is difficult to maintain step ratios between adjacent shift stages to be linear, by which driving efficiency of an engine and drivability of a vehicle are deteriorated.

Thus, research studies are underway for developing a high efficiency automatic transmission having nine or more speeds.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of, by minimal complexity, realizing at least forward ninth speeds and at least one reverse speed, increasing a gear ratio span so as to improve power delivery performance and fuel consumption, and achieving linearity of shift stage step ratios.

According to various aspects of the present invention, a planetary gear set of an automatic transmission for a vehicle may include an input shaft for receiving an engine torque, an output shaft for outputting a shifted torque of the engine, a first planetary gear set including first, second, and third rotational elements, a second planetary gear set including fourth, fifth, and sixth rotational elements, a third planetary gear set including seventh, eighth, and ninth rotational elements, a fourth planetary gear set including tenth, eleventh, and twelfth rotational elements, and six control elements for selectively interconnecting the rotational elements and a transmission housing, in which the input shaft may be continuously connected to the first rotational element, the output shaft may be continuously connected to the eleventh rotational element, the first rotational element may be continuously connected to the sixth rotational element, the second rotational element may be continuously connected to the ninth rotational element, the third rotational element may be continuously connected to the tenth rotational element, the fifth rotational element may be continuously connected to the eleventh rotational element, and the seventh rotational element may be selectively connected to the transmission housing.

The eighth rotational element may be selectively connected to the transmission housing, the twelfth rotational element may be selectively connected to the transmission housing, the input shaft may be selectively connected to the eighth rotational element, the third rotational element may be selectively connected to the eighth rotational element, and the fourth rotational element may be selectively connected to the twelfth rotational element.

The first, second, and third rotational elements may be respectively a sun gear, a ring gear, and a planet carrier of the first planetary gear set, the fourth, fifth, and sixth rotational elements are respectively a sun gear, a planet carrier, and a ring gear of the second planetary gear set, the seventh, eighth, and ninth rotational elements are respectively a sun gear, a planet carrier, and a ring gear of the third planetary gear set, and the tenth, eleventh, and twelfth rotational elements are respectively a sun gear, a planet carrier, and a ring gear of the fourth planetary gear set.

According to various aspects of the present invention, a planetary gear set of an automatic transmission for a vehicle may include an input shaft for receiving an engine torque, an output shaft for outputting a shifted torque, a first planetary gear set including first, second, and third rotational elements, a second planetary gear set including fourth, fifth, and sixth rotational elements, a third planetary gear set including seventh, eighth, and ninth rotational elements, a fourth planetary gear set including tenth, eleventh, and twelfth rotational elements, six control elements for selectively interconnecting the rotational elements and a transmission housing, a first connecting member connected to the first rotational element and the sixth rotational element, and directly connected to the input shaft, a second connecting member connected to the second rotational element and the ninth rotational element, a third connecting member connected to the third rotational element and the tenth rotational element, a fourth connecting member connected to the fourth rotational element, a fifth connecting member connected to the fifth rotational element and the eleventh rotational element, and directly connected to the output shaft, a sixth connecting member connected to the seventh rotational element and selectively connected to the transmission housing, a seventh connecting member connected to the eighth rotational element, selectively connected to the input shaft and the third connecting member, and selectively connected to the transmission housing, and an eighth connecting member connected to the twelfth rotational element, selectively connected to the fourth connecting member, and selectively connected to the transmission housing.

The first planetary gear set may be a double pinion planetary gear set, where the first rotational element may be a first sun gear, the second rotational element may be a first ring gear, and the third rotational element may be a first planet carrier, the second planetary gear set may be a single pinion planetary gear set, where the fourth rotational element may be a second sun gear, the fifth rotational element may be a second planet carrier, and the sixth rotational element may be a second ring gear, the third planetary gear set may be a single pinion planetary gear set, where the seventh rotational element may be a third sun gear, the eighth rotational element may be a third planet carrier, and the ninth rotational element may be a third ring gear, and the fourth planetary gear set may be a single pinion planetary gear set, where the tenth rotational element may be a fourth sun gear, the eleventh rotational element may be a fourth planet carrier, and the twelfth rotational element may be a fourth ring gear.

The six control elements may include a first clutch selectively connecting the input shaft and the seventh connecting member, a second clutch selectively connecting the third connecting member and the seventh connecting member, a third clutch selectively connecting the fourth connecting member and the eighth connecting member, a first brake selectively connecting the sixth connecting member and the transmission housing, a second brake selectively connecting the seventh connecting member and the transmission housing, and a third brake selectively connecting the eighth connecting member and the transmission housing.

Shift stages realized by selective operation of three control elements among the six control elements may include forward first speed formed by simultaneous operation of the second clutch and the second and third brakes, a forward second speed formed by simultaneous operation of the first and second clutches and the third brake, a forward third speed formed by simultaneous operation of the first clutch and the first and third brakes, a forward fourth speed formed by simultaneous operation of the third clutch and the first and third brakes, a forward fifth speed formed by simultaneous operation of the first and third clutches and the first brake, a forward sixth speed formed by simultaneous operation of the first, second, and third clutches, a forward seventh speed formed by simultaneous operation of the second and third clutches and the first brake, a forward eighth speed formed by simultaneous operation of the second and third clutches and the second brake, a forward ninth speed formed by simultaneous operation of the third clutch and the first and second brakes, and a reverse speed formed by simultaneous operation of the first, second, and third brakes.

According to various aspects of the present invention, a planetary gear set of an automatic transmission for a vehicle may include an input shaft for receiving an engine torque, an output shaft for outputting a shifted torque, a first planetary gear set as a double pinion planetary gear set including first, second, and third rotational elements, a second planetary gear set as a single pinion planetary gear set including fourth, fifth, and sixth rotational elements, a third planetary gear set as a single pinion planetary gear set including seventh, eighth, and ninth rotational elements, a fourth planetary gear set as a single pinion planetary gear set including tenth, eleventh, and twelfth rotational elements, a first connecting member connected to the first rotational element and the sixth rotational element, and directly connected to the input shaft, a second connecting member connected to the second rotational element and the ninth rotational element, a third connecting member connected to the third rotational element and the tenth rotational element, a fourth connecting member connected to the fourth rotational element, a fifth connecting member connected to the fifth rotational element and the eleventh rotational element, and directly connected to the output shaft, a sixth connecting member connected to the seventh rotational element and selectively connected to the transmission housing, a seventh connecting member connected to the eighth rotational element, selectively connected to the input shaft and the third connecting member, and selectively connected to the transmission housing, an eighth connecting member connected to the twelfth rotational element, selectively connected to the fourth connecting member, and selectively connected to the transmission housing, a first clutch selectively connecting the input shaft and the seventh connecting member, a second clutch selectively connecting the third connecting member and the seventh connecting member, a third clutch selectively connecting the fourth connecting member and the eighth connecting member, a first brake selectively connecting the sixth connecting member and the transmission housing, a second brake selectively connecting the seventh connecting member and the transmission housing, and a third brake selectively connecting the eighth connecting member and the transmission housing.

The first planetary gear set may include a first sun gear as the first rotational element, a first ring gear as the second rotational element, and a first planet carrier as the third rotational element, the second planetary gear set may include a second sun gear as the fourth rotational element, a second planet carrier as the fifth rotational element, and a second ring gear as the sixth rotational element, the third planetary gear set may include a third sun gear as the seventh rotational element, a third planet carrier as the eighth rotational element, and a third ring gear as the ninth rotational element, and the fourth planetary gear set may include a fourth sun gear as the tenth rotational element, a fourth planet carrier as the eleventh rotational element, and a fourth ring gear as the twelfth rotational element.

According to various aspects of the present invention, a planetary gear set of claim of an automatic transmission for a vehicle may include an input shaft for receiving an engine torque, an output shaft for outputting a shifted torque of the engine, a first planetary gear set as a double pinion planetary gear set including a first sun gear, a first planet carrier, and a first ring gear, a second planetary gear set as a single pinion planetary gear set including a second sun gear, a second planet carrier, and a second ring gear, a third planetary gear set as a single pinion planetary gear set including a third sun gear, a third planet carrier, and a third ring gear, a fourth planetary gear set as a single pinion planetary gear set including a fourth sun gear, a fourth planet carrier, and a fourth ring gear, a first connecting member connected to the first sun gear and the second ring gear, and directly connected to the input shaft, a second connecting member connected to the first ring gear and the third ring gear, a third connecting member connected to the first planet carrier and the fourth sun gear, a fourth connecting member connected to the second sun gear, a fifth connecting member connected to the second planet carrier and the fourth planet carrier, and directly connected to the output shaft, a sixth connecting member connected to the third sun gear and selectively connected to the transmission housing, a seventh connecting member connected to the third planet carrier, selectively connected to the input shaft and the third connecting member, and selectively connected to the transmission housing, an eighth connecting member connected to the fourth ring gear, selectively connected to the fourth connecting member, and selectively connected to the transmission housing, and six control elements selectively connecting the connecting members and the transmission housing.

A planetary gear train according to various embodiments of the present invention may realize at least nine forward speeds and at least one reverse speed formed by operating the four planetary gear sets as simple planetary gear sets by controlling six control elements.

In addition, a planetary gear train according to various embodiments of the present invention may realize a gear ratio span of more than 9.0, thereby maximizing efficiency of driving an engine.

In addition, the linearity of step ratios of shift stages is secured while multi-staging the shift stage with high efficiency, securing linearity of step ratios of shift stages, thereby making it possible to improve drivability such as acceleration before and after a shift, an engine speed rhythmic sense, and the like.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift stages in the exemplary planetary gear train according to the present invention.

Figure 1:
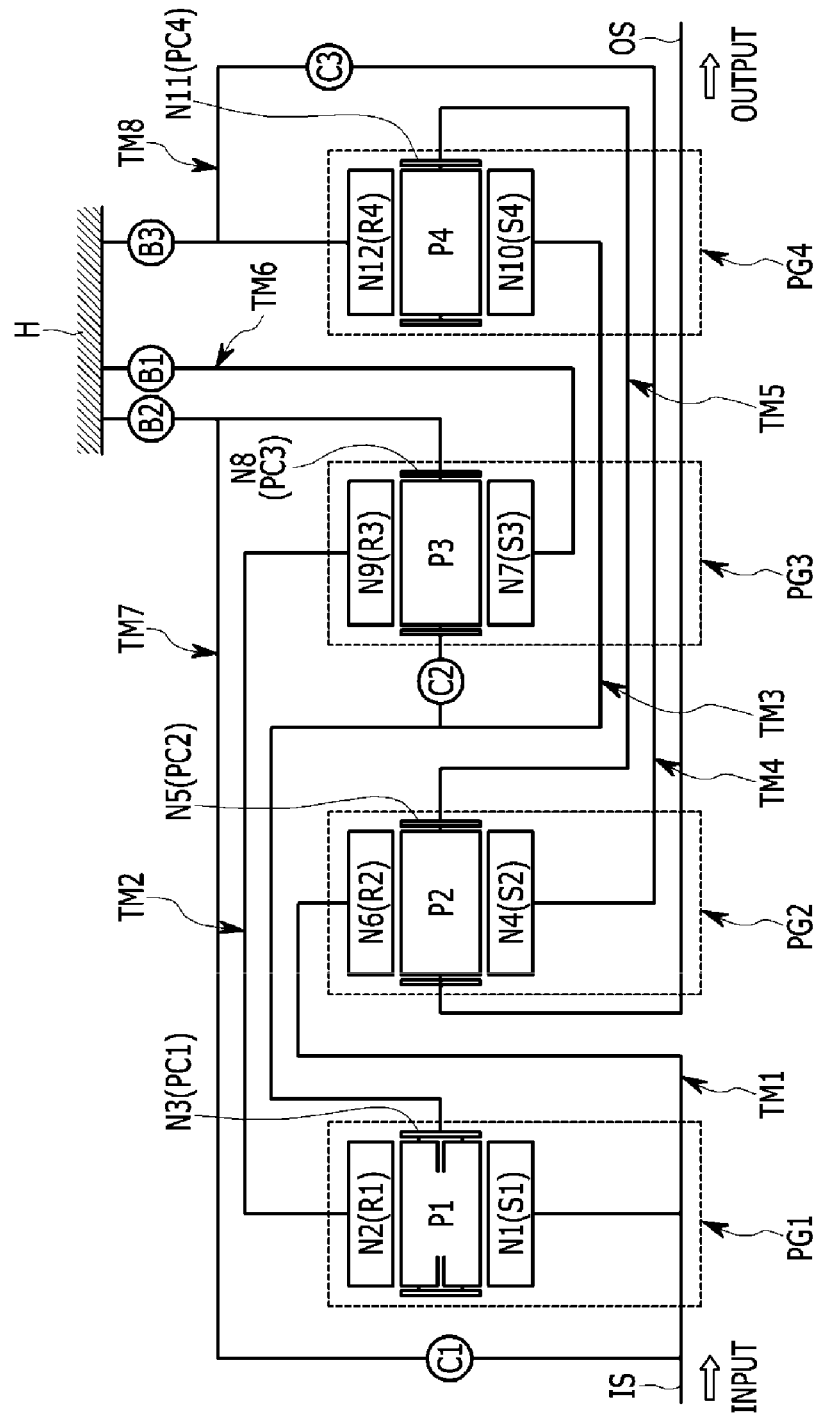
FIG. 1 is a schematic diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of a planetary gear train according to various embodiments of the present invention. Referring to FIG. 1, a planetary gear train according to various embodiments of the present invention includes first, second, third, and fourth planetary gear sets PG1, PG2, PG3, and PG4 arranged on a same axis, an input shaft IS, an output shaft OS, eight connecting members TM1 to TM8 for interconnecting rotational elements of the first, second, third, and fourth planetary gear sets PG1, PG2, PG3, and PG4, six control elements C1 to C3 and B1 to B3, and a transmission housing H. Torque input from the input shaft IS is shifted by cooperative operation of the first, second, third, and fourth planetary gear sets PG1, PG2, PG3, and PG4, and then output through the output shaft OS. The simple planetary gear sets are arranged in the order of first, first, second, third and fourth planetary gear sets PG1, PG2, PG3 and PG4, from an engine side. The input shaft IS is an input member and the torque from a crankshaft of an engine, after being torque-converted through a torque converter, is input into the input shaft IS. The output shaft OS is an output member, and being arranged on a same axis with the input shaft IS, delivers a shifted torque to a drive shaft through a differential apparatus.

The first planetary gear set PG1 is a double pinion planetary gear set, and includes a first sun gear S1, a first planet carrier PC1 that supports a first pinion P1 externally engaged with the first sun gear S1, and a first ring gear R1 internally engaged with the first pinion P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that supports a second pinion P2 externally engaged with the second sun gear S2, and a second ring gear R2 internally engaged with the second pinion P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set, and includes a third sun gear S3, a third planet carrier PC3 that supports a third pinion P3 externally engaged with the third sun gear S3, and a third ring gear R3 internally engaged with the third pinion P3. The third sun gear S3 acts as a seventh rotational element N7, the third planet carrier PC3 acts as an eighth rotational element N8, and the third ring gear R3 acts as a ninth rotational element N9.

The fourth planetary gear set PG4 is a single pinion planetary gear set, and includes a fourth sun gear S4, a fourth planet carrier PC4 that supports a fourth pinion P4 externally engaged with the fourth sun gear S4, and a fourth ring gear R4 internally engaged with the fourth pinion P4. The fourth sun gear S4 acts as a tenth rotational element N10, the fourth planet carrier PC4 acts as an eleventh rotational element N11, and the fourth ring gear R4 acts as a twelfth rotational element N12.

In the arrangement of the first, second, third, and fourth planetary gear sets PG1, PG2, PG3, and PG4, the first rotational element N1 is directly connected with the sixth rotational element N6, the second rotational element N2 is directly connected with the ninth rotational element N9, the third rotational element N3 is directly connected with the tenth rotational element N10, and the fifth rotational element N5 is directly connected with the eleventh rotational element N11, by eight connecting members TM1 to TM8.

The eight connecting members TM1 to TM8 are arranged as follows.

The first connecting member TM1 is connected with the first rotational element N1 (first sun gear S1) and the sixth rotational element N6 (second ring gear R2), and directly connected with the input shaft IS, thereby continuously acting as an input element.

The second connecting member TM2 is connected with the second rotational element N2 (first ring gear R1) and the ninth rotational element N9 (third ring gear R3).

The third connecting member TM3 is connected with the third rotational element N3 (first planet carrier PC1) and the tenth rotational element N10 (fourth sun gear S4).

The fourth connecting member TM4 is connected with fourth rotational element N4 (second sun gear S2).

The fifth connecting member TM5 is connected with the fifth rotational element N5 (second planet carrier PC2) and the eleventh rotational element N11 (fourth planet carrier PC4), and directly connected with the output shaft OS thereby continuously acting as an output element.

The sixth connecting member TM6 is connected with the seventh rotational element N7 (third sun gear S3), and selectively connected with the transmission housing H, thereby acting as a selective fixed element.

The seventh connecting member TM7 is connected with the eighth rotational element N8 (third planet carrier PC3), selectively connected with the third connecting member TM3, selectively connected with the input shaft IS thereby acting as a selective input element, and selectively connected with the transmission housing H, thereby acting as a selective fixed element.

The eighth connecting member TM8 is connected with the twelfth rotational element N12 (fourth ring gear R4), selectively connected with the fourth connecting member TM4, and selectively connected with the transmission housing H, thereby acting as a selective fixed element.

The connecting members TM1 to TM8 may be selectively interconnected with one another by control elements of three clutches C1, C2, and C3.

The connecting members TM1 to TM8 may be selectively connected with the transmission housing H, by control elements of three brakes B1, B2, and B3.

The six control elements C1 to C3 and B1 to B3 are arranged as follows.

The first clutch C1 is arranged between the input shaft IS and the seventh connecting member TM7, such that the input shaft IS and the seventh connecting member TM7 may selectively become integral.

The second clutch C2 is arranged between the third connecting member TM3 and the seventh connecting member TM7, such that the third connecting member TM3 and the seventh connecting member TM7 may selectively become integral.

The third clutch C3 is arranged between the fourth connecting member TM4 and the eighth connecting member TM8, such that the fourth connecting member TM4 and the eighth connecting member TM8 may selectively become integral.

The first brake B1 is arranged between the sixth connecting member TM6 and the transmission housing H, such that the sixth connecting member TM6 may selectively act as a fixed element.

The second brake B2 is arranged between the seventh connecting member TM7 and the transmission housing H, such that the seventh connecting member TM7 may selectively act as a fixed element.

The third brake B3 is arranged between the eighth connecting member TM8 and the transmission housing H, such that the eighth connecting member TM8 may selectively act as a fixed element.

The control elements of the first, second, and third clutches C1, C2, and C3 and the first, second, and third brakes B1, B2, and B3 may be realized as multi-plate hydraulic pressure friction devices that are frictionally engaged by hydraulic pressure.

FIG. 2 is an operational chart for respective control elements at respective shift stages in a planetary gear train according to various embodiments of the present invention. As shown in FIG. 2, a planetary gear train according to various embodiments of the present invention performs shifting by operating three control elements at respective shift stages.

In the forward first speed shift stage D1, the second clutch C2 and the second and third brakes B2 and B3 are simultaneously operated. As a result, the third connecting member TM3 is interconnected with the seventh connecting member TM7 by the operation of the second clutch C2. In this state, torque of the input shaft IS is input to the first connecting member TM1. In addition, the seventh and eighth connecting members TM7 and TM8 simultaneously act as fixed elements by the operation of the second and third brakes B2 and B3, thereby realizing the forward first speed by cooperative operation of respective connecting members and outputting a shifted torque through the output shaft OS connected with the fifth connecting member TM5.

In the forward second speed shift stage D2, the first and second clutches C1 and C2 and the third brake B3 are simultaneously operated. As a result, the seventh connecting member TM7 is interconnected with the input shaft IS by the operation of the first clutch C1, and the third connecting member TM3 is interconnected with the seventh connecting member TM7 by the operation of the second clutch C2. In this state, the torque of the input shaft IS is simultaneously input to the first connecting member TM1 and the seventh connecting member TM7. In addition, the eighth connecting member TM8 simultaneously acts as a fixed element by the operation of third brake B3, thereby realizing the forward second speed by cooperative operation of respective connecting members and outputting a shifted torque through the output shaft OS connected with the fifth connecting member TM5.

In the forward third speed shift stage D3, the first clutch C1 and the first and third brakes B1 and B3 are simultaneously operated. As a result, the seventh connecting member TM7 is interconnected with the input shaft IS by the operation of the first clutch C1. In this state, the torque of the input shaft IS is simultaneously input to the first connecting member TM1 and the seventh connecting member TM7. In addition, the sixth and eighth connecting members TM6 and TM8 simultaneously act as fixed elements by the operation of the first and third brakes B1 and B3, thereby realizing the forward third speed by cooperative operation of respective connecting members and outputting a shifted torque through the output shaft OS connected with the fifth connecting member TM5.

In the forward fourth speed shift stage D4, the third clutch C3 and the first and third brakes B1 and B3 are simultaneously operated. As a result, the fourth connecting member TM4 is interconnected with the eighth connecting member TM8 by the operation of the third clutch C3. In this state, the torque of the input shaft IS is simultaneously input to the first connecting member TM1 and the seventh connecting member TM7. In addition, the sixth and eighth connecting members TM6 and TM8 simultaneously act as fixed elements by the operation of the first and third brakes B1 and B3, thereby realizing the forward fourth speed by cooperative operation of respective connecting members and outputting a shifted torque through the output shaft OS connected with the fifth connecting member TM5.

In the forward fifth speed shift stage D5, the first and third clutches C1 and C3 and the first brake B1 are simultaneously operated. As a result, the seventh connecting member TM7 is interconnected with the input shaft IS by the operation of the first clutch C1, and the fourth connecting member TM4 is interconnected with the eighth connecting member TM8 by the operation of the third clutch C3. In this state, the torque of the input shaft IS is simultaneously input to the first connecting member TM1 and the seventh connecting member TM7. In addition, the sixth connecting member TM6 simultaneously acts as a fixed element by the operation of first brake B1, thereby realizing the forward fifth speed by cooperative operation of respective connecting members and outputting a shifted torque through the output shaft OS connected with the fifth connecting member TM5.

In the forward sixth speed shift stage D6, the first, second, and third clutches C1, C2, and C3 are simultaneously operated. As a result, the seventh connecting member TM7 is interconnected with the input shaft IS by the operation of the first clutch C1, the third connecting member TM3 is interconnected with the seventh connecting member TM7 by the operation of the second clutch C2, and the fourth connecting member TM4 is interconnected with the eighth connecting member TM8 by the operation of the third clutch C3. In this state, torque is input to the first connecting member TM1 and the seventh connecting member TM7. In addition, the first, second, third, and fourth planetary gear sets PG1, PG2, PG3, and PG4 becomes entirely integral by the operation of the second clutch C2 and the third clutch TM3, thereby realizing the forward sixth speed and outputting an inputted torque through the output shaft OS connected with fifth connecting member TM7.

In the forward seventh speed shift stage D7, the second and third clutches C2 and C3 and the first brake B1 are simultaneously operated. As a result, the third connecting member TM3 is interconnected with the seventh connecting member TM7 by the operation of the second clutch C2, and the fourth connecting member TM4 is interconnected with the eighth connecting member TM8 by the operation of the third clutch C3. In this state, torque of the input shaft IS is input to the first connecting member TM1. In addition, the sixth connecting member TM6 simultaneously acts as a fixed element by the operation of first brake B1, thereby realizing the forward seventh speed by cooperative operation of respective connecting members and outputting a shifted torque through the output shaft OS connected with the fifth connecting member TM5.

In the forward eighth speed shift stage D8, the second and third clutches C2 and C3 and the second brake B2 are simultaneously operated. As a result, the third connecting member TM3 is interconnected with the seventh connecting member TM7 by the operation of the second clutch C2, and the fourth connecting member TM4 is interconnected with the eighth connecting member TM8 by the operation of the third clutch C3. In this state, torque of the input shaft IS is input to the first connecting member TM1. In addition, the seventh connecting member TM7 simultaneously acts as a fixed element by the operation of second brake B2, thereby realizing the forward eighth speed by cooperative operation of respective connecting members and outputting a shifted torque through the output shaft OS connected with the fifth connecting member TM5.

In the forward ninth speed shift stage D9, the third clutch C3 and the first and second brakes B1 and B2 are simultaneously operated. As a result, the fourth connecting member TM4 is interconnected with the eighth connecting member TM8 by the operation of the third clutch C3. In this state, torque is input to the first connecting member TM1. In addition, the sixth and seventh connecting members TM6 and TM7 simultaneously act as fixed elements by the operation of the first and second brakes B1 and B2, thereby realizing the forward eighth speed by cooperative operation of respective connecting members and outputting a shifted torque through the output shaft OS connected with the fifth connecting member TM5.

In the reverse speed REV, the first, second, and third brakes B1, B2, and B3 are simultaneously operated. As a result, torque of the input shaft IS is input to the first connecting member TM1, and the sixth, seventh, and eighth connecting members TM6, TM7, and TM8 simultaneously act as fixed elements by the operation of the first, second, and third brakes B1, B2, and B3, thereby realizing the reverse speed by cooperative operation of respective connecting members and outputting a shifted torque through the output shaft OS connected with the fifth connecting member TM5.

As described above, a planetary gear train according to various embodiments of the present invention may realize at least the forward ninth speed and at least one reverse speed formed by operating four planetary gear set PG1, PG2, PG3, and PG4 by controlling the three clutches C1, C2, and C3 and the three brakes B1, B2, and B3.

In addition, a planetary gear train according to various embodiments of the present invention may realize a gear ratio span of more than 9.2, thereby maximizing efficiency of driving an engine.

In addition, the linearity of step ratios of shift stages is secured while multi-staging the shift stage with high efficiency, thereby making it possible to improve drivability such as acceleration before and after a shift, an engine speed rhythmic sense, and the like.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear set of an automatic transmission for a vehicle, comprising:
   an input shaft for receiving an engine torque;
   an output shaft for outputting a shifted torque of the engine;
   a first planetary gear set including first, second, and third rotational elements of twelve rotational elements;

a second planetary gear set including fourth, fifth, and sixth rotational elements of the twelve rotational elements;
a third planetary gear set including seventh, eighth, and ninth rotational elements of the twelve rotational elements;
a fourth planetary gear set including tenth, eleventh, and twelfth rotational elements of the twelve rotational elements; and
six control elements, each of which is for selectively interconnecting at least one rotational element among the twelve rotational elements and another rotational element among the twelve rotational elements or the input shaft, or selectively interconnecting at least one rotational element among the twelve rotational elements and a transmission housing,
wherein:
the input shaft is fixedly to the first rotational element to have a same rotation speed between the input shaft and the first rotational element;
the output shaft is fixedly connected to the eleventh rotational element to always rotate at a speed of the eleventh rotational element;
the first rotational element is fixedly connected to the sixth rotational element to always have a same rotation speed between the first rotational element and the sixth rotational element;
the second rotational element is fixedly connected to the ninth rotational element to always have a same rotation speed between the second rotational element and the ninth rotational element;
the third rotational element is fixedly connected to the tenth rotational element to always have a same rotation speed between the third rotational element and the tenth rotational element;
the fifth rotational element is fixedly connected to the eleventh rotational element to always have a same rotation speed between the fifth rotational element and the eleventh rotational element; and
the seventh rotational element is selectively connected to the transmission housing.

2. The planetary gear set of claim 1, wherein:
the eighth rotational element is selectively connected to the transmission housing;
the twelfth rotational element is selectively connected to the transmission housing;
the input shaft is selectively connected to the eighth rotational element;
the third rotational element is selectively connected to the eighth rotational element; and
the fourth rotational element is selectively connected to the twelfth rotational element.

3. The planetary gear set of claim 1, wherein:
the first, second, and third rotational elements are respectively a sun gear, a ring gear, and a planet carrier of the first planetary gear set;
the fourth, fifth, and sixth rotational elements are respectively a sun gear, a planet carrier, and a ring gear of the second planetary gear set;
the seventh, eighth, and ninth rotational elements are respectively a sun gear, a planet carrier, and a ring gear of the third planetary gear set; and
the tenth, eleventh, and twelfth rotational elements are respectively a sun gear, a planet carrier, and a ring gear of the fourth planetary gear set.

4. A planetary gear set of an automatic transmission for a vehicle, comprising:
an input shaft for receiving an engine torque;
an output shaft for outputting a shifted torque;
a first planetary gear set including first, second, and third rotational elements of twelve rotational elements;
a second planetary gear set including fourth, fifth, and sixth rotational elements of the twelve rotational elements;
a third planetary gear set including seventh, eighth, and ninth rotational elements of the twelve rotational elements;
a fourth planetary gear set including tenth, eleventh, and twelfth rotational elements of the twelve rotational elements;
six control elements, each of which is for selectively interconnecting at least one rotational element among the twelve rotational elements and another rotational element among the twelve rotational elements or the input shaft, or selectively interconnecting at least one rotational element among the twelve rotational elements and a transmission housing;
a first connecting member fixedly connected to the first rotational element and the sixth rotational element, and fixedly connected to the input shaft, such that the first and sixth rotational elements always rotate at a speed of the input shaft;
a second connecting member fixedly connected to the second rotational element and the ninth rotational element to always have a same rotation speed between the second rotational element and the ninth rotational element;
a third connecting member fixedly connected to the third rotational element and the tenth rotational element to always have a same rotation speed between the third rotational element and the tenth rotational element;
a fourth connecting member fixedly connected to the fourth rotational element thereby always rotating at a speed of the fourth rotational element;
a fifth connecting member fixedly connected to the fifth rotational element and the eleventh rotational element, and fixedly connected to the output shaft such that the fifth and eleventh rotational elements always rotate at a speed of the output shaft;
a sixth connecting member fixedly connected to the seventh rotational element to always rotate at a same speed with the seventh rotational element and selectively connected to the transmission housing;
a seventh connecting member fixedly connected to the eighth rotational element to always rotate at a same speed with the eighth rotational element, selectively connected to the input shaft and the third connecting member, and selectively connected to the transmission housing; and
an eighth connecting member fixedly connected to the twelfth rotational element to always rotate at a same speed with the twelfth rotational element, selectively connected to the fourth connecting member, and selectively connected to the transmission housing.

5. The planetary gear set of claim 4, wherein:
the first planetary gear set is a double pinion planetary gear set, where the first rotational element is a first sun gear, the second rotational element is a first ring gear, and the third rotational element is a first planet carrier;
the second planetary gear set is a single pinion planetary gear set, where the fourth rotational element is a second sun gear, the fifth rotational element is a second planet carrier, and the sixth rotational element is a second ring gear;

the third planetary gear set is a single pinion planetary gear set, where the seventh rotational element is a third sun gear, the eighth rotational element is a third planet carrier, and the ninth rotational element is a third ring gear; and the fourth planetary gear set is a single pinion planetary gear set, where the tenth rotational element is a fourth sun gear, the eleventh rotational element is a fourth planet carrier, and the twelfth rotational element is a fourth ring gear.

6. The planetary gear set of claim 4, wherein the six control elements comprise:
a first clutch selectively connecting the input shaft and the seventh connecting member;
a second clutch selectively connecting the third connecting member and the seventh connecting member;
a third clutch selectively connecting the fourth connecting member and the eighth connecting member;
a first brake selectively connecting the sixth connecting member and the transmission housing;
a second brake selectively connecting the seventh connecting member and the transmission housing; and
a third brake selectively connecting the eighth connecting member and the transmission housing.

7. The planetary gear set of claim 6, wherein shift stages realized by selective operation of three control elements among the six control elements comprise:
a forward first speed formed by simultaneous operation of the second clutch and the second and third brakes;
a forward second speed formed by simultaneous operation of the first and second clutches and the third brake;
a forward third speed formed by simultaneous operation of the first clutch and the first and third brakes;
a forward fourth speed formed by simultaneous operation of the third clutch and the first and third brakes;
a forward fifth speed formed by simultaneous operation of the first and third clutches and the first brake;
a forward sixth speed formed by simultaneous operation of the first, second, and third clutches;
a forward seventh speed formed by simultaneous operation of the second and third clutches and the first brake;
a forward eighth speed formed by simultaneous operation of the second and third clutches and the second brake;
a forward ninth speed formed by simultaneous operation of the third clutch and the first and second brakes; and
a reverse speed formed by simultaneous operation of the first, second, and third brakes.

8. A planetary gear set of an automatic transmission for a vehicle, comprising:
an input shaft for receiving an engine torque;
an output shaft for outputting a shifted torque;
a first planetary gear set as a double pinion planetary gear set including first, second, and third rotational elements;
a second planetary gear set as a single pinion planetary gear set including fourth, fifth, and sixth rotational elements;
a third planetary gear set as a single pinion planetary gear set including seventh, eighth, and ninth rotational elements;
a fourth planetary gear set as a single pinion planetary gear set including tenth, eleventh, and twelfth rotational elements;
a first connecting member fixedly connected to the first rotational element and the sixth rotational element, and fixedly connected to the input shaft, such that the first and sixth rotational elements always rotate at a speed of the input shaft;
a second connecting member fixedly connected to the second rotational element and the ninth rotational element to always have a same rotation speed between the second rotational element and the ninth rotational element;
a third connecting member fixedly connected to the third rotational element and the tenth rotational element to always have a same rotation speed between the third rotational element and the tenth rotational element;
a fourth connecting member fixedly connected to the fourth rotational element thereby always rotating at a speed of the fourth rotational element;
a fifth connecting member fixedly connected to the fifth rotational element and the eleventh rotational element, and fixedly connected to the output shaft such that the fifth and eleventh rotational elements always rotate at a speed of the output shaft;
a sixth connecting member fixedly connected to the seventh rotational element to always rotate at a same speed with the seventh rotational element, and selectively connected to the transmission housing;
a seventh connecting member fixedly connected to the eighth rotational element to always rotate at a same speed with the eighth rotational element, selectively connected to the input shaft and the third connecting member, and selectively connected to the transmission housing;
an eighth connecting member fixedly connected to the twelfth rotational element to always rotate at a same speed with the twelfth rotational element, selectively connected to the fourth connecting member, and selectively connected to the transmission housing;
a first clutch selectively connecting the input shaft and the seventh connecting member;
a second clutch selectively connecting the third connecting member and the seventh connecting member;
a third clutch selectively connecting the fourth connecting member and the eighth connecting member;
a first brake selectively connecting the sixth connecting member and the transmission housing;
a second brake selectively connecting the seventh connecting member and the transmission housing; and
a third brake selectively connecting the eighth connecting member and the transmission housing.

9. The planetary gear set of claim 8, wherein shift stages realized by selective operation of three control elements among six control elements of the three clutches and the three brakes comprise:
a forward first speed formed by simultaneous operation of the second clutch and the second and third brakes;
a forward second speed formed by simultaneous operation of the first and second clutches and the third brake;
a forward third speed formed by simultaneous operation of the first clutch and the first and third brakes;
a forward fourth speed formed by simultaneous operation of the third clutch and the first and third brakes;
a forward fifth speed formed by simultaneous operation of the first and third clutches and the first brake;
a forward sixth speed formed by simultaneous operation of the first, second, and third clutches;
a forward seventh speed formed by simultaneous operation of the second and third clutches and the first brake;
a forward eighth speed formed by simultaneous operation of the second and third clutches and the second brake;

a forward ninth speed formed by simultaneous operation of the third clutch and the first and second brakes; and a reverse speed formed by simultaneous operation of the first, second, and third brakes.

10. A planetary gear set of an automatic transmission for a vehicle, comprising:
an input shaft for receiving an engine torque;
an output shaft for outputting a shifted torque of the engine;
a first planetary gear set as a double pinion planetary gear set including a first sun gear, a first planet carrier, and a first ring gear of twelve rotational elements;
a second planetary gear set as a single pinion planetary gear set including a second sun gear, a second planet carrier, and a second ring gear of the twelve rotational elements;
a third planetary gear set as a single pinion planetary gear set including a third sun gear, a third planet carrier, and a third ring gear of the twelve rotational elements;
a fourth planetary gear set as a single pinion planetary gear set including a fourth sun gear, a fourth planet carrier, and a fourth ring gear of the twelve rotational elements;
a first connecting member connected to the first sun gear and the second ring gear, and directly connected to the input shaft to have a same rotation speed between the first sun gear, the second ring gear, and the input shaft;
a second connecting member connected to the first ring gear and the third ring gear to have a same rotation speed between the first ring gear and the third ring gear;
a third connecting member connected to the first planet carrier and the fourth sun gear to have a same rotation speed between the first planet carrier and the fourth sun gear;
a fourth connecting member connected to the second sun gear;
a fifth connecting member connected to the second planet carrier and the fourth planet carrier, and directly connected to the output shaft gear;
a sixth connecting member connected to the third sun gear and selectively connected to the transmission housing;
a seventh connecting member connected to the third planet carrier, selectively connected to the input shaft and the third connecting member, and selectively connected to the transmission housing;
an eighth connecting member connected to the fourth ring gear, selectively connected to the fourth connecting member, and selectively connected to the transmission housing; and six control elements, each of which is for selectively interconnecting at least one rotational element among the twelve rotational elements and another rotational element among the twelve rotational elements or the input shaft, or selectively interconnecting at least one rotational element among the twelve rotational elements and a transmission housing.

11. The planetary gear set of claim 10, wherein the six control elements comprise:
a first clutch selectively connecting the input shaft and the seventh connecting member;
a second clutch selectively connecting the third connecting member and the seventh connecting member;
a third clutch selectively connecting the fourth connecting member and the eighth connecting member;
a first brake selectively connecting the sixth connecting member and the transmission housing;
a second brake selectively connecting the seventh connecting member and the transmission housing; and
a third brake selectively connecting the eighth connecting member and the transmission housing.

12. The planetary gear set of claim 11, wherein shift stages realized by selective operation of three control elements among the six control elements comprise:
a forward first speed formed by simultaneous operation of the second clutch and the second and third brakes;
a forward second speed formed by simultaneous operation of the first and second clutches and the third brake;
a forward third speed formed by simultaneous operation of the first clutch and the first and third brakes;
a forward fourth speed formed by simultaneous operation of the third clutch and the first and third brakes;
a forward fifth speed formed by simultaneous operation of the first and third clutches and the first brake;
a forward sixth speed formed by simultaneous operation of the first, second, and third clutches;
a forward seventh speed formed by simultaneous operation of the second and third clutches and the first brake;
a forward eighth speed formed by simultaneous operation of the second and third clutches and the second brake;
a forward ninth speed formed by simultaneous operation of the third clutch and the first and second brakes;
a reverse speed formed by simultaneous operation of the first, second, and third brakes.

* * * * *